United States Patent [19]

Satoh

[11] Patent Number: 4,905,093

[45] Date of Patent: Feb. 27, 1990

[54] VIDEO REPRODUCTION APPARATUS WITH PLURAL HEADS AND FIELD MEMORY

[75] Inventor: Keiji Satoh, Tokyo, Japan

[73] Assignee: Canon Kabushiki Kaisha, Tokyo, Japan

[21] Appl. No.: 204,878

[22] Filed: Jun. 10, 1988

[30] Foreign Application Priority Data

Jun. 23, 1987 [JP] Japan .................................. 62-156135
Jun. 23, 1987 [JP] Japan .................................. 62-156136

[51] Int. Cl.⁴ .......................................... H04N 5/782
[52] U.S. Cl. ..................................... 358/335; 360/61; 360/63; 360/77.01; 360/77.05; 360/77.14
[58] Field of Search ..................... 358/335; 360/24, 27, 360/33.1, 35.1, 54, 55, 61, 62, 63, 75, 77.01, 77.05, 77.14

[56] References Cited

U.S. PATENT DOCUMENTS 4,819,099  4/1989  Saito ................................. 360/64 X Primary Examiner—Robert L. Richardson
Attorney, Agent, or Firm—Robin, Blecker, Daley & Driscoll

[57] ABSTRACT

A video signal reproduction apparatus having a plurality of heads arranged to alternately trace the tracks on a tape-shaped recording medium one at a time for every predetermined period, wherein while the medium is being transported at the same speed as when recording, the recorded video signals are reproduced, whereby if it happens that one of the plurality of reproducing heads fails to sufficiently pick up the video signal, the reproduced signal of that head is replaced by that reproduced signal of one of the other reproducing heads which has been stored in a memory which is capable of storing video signals for at least the aforesaid period.

8 Claims, 6 Drawing Sheets

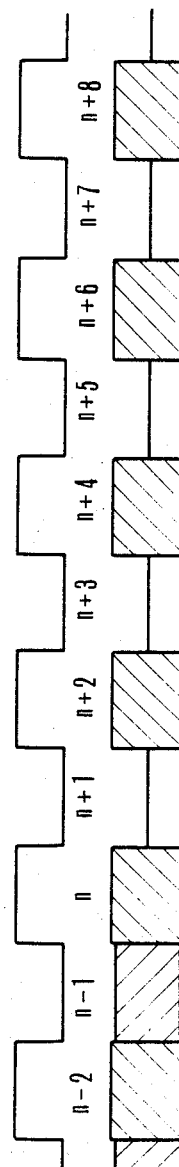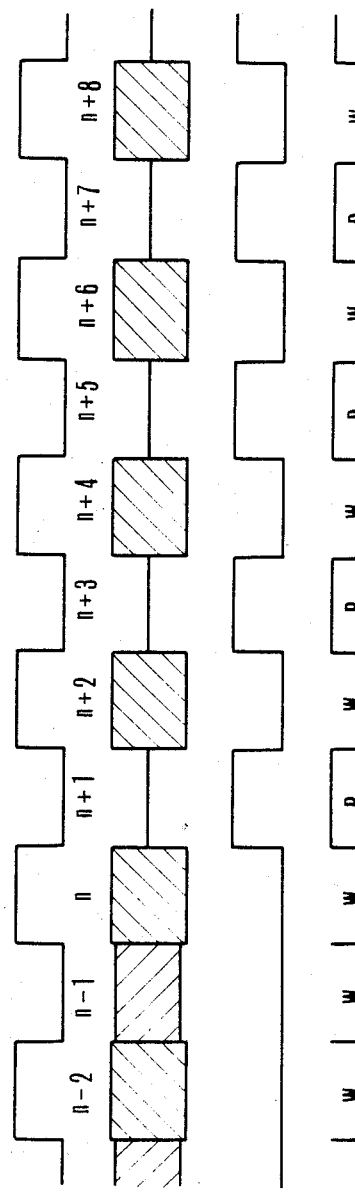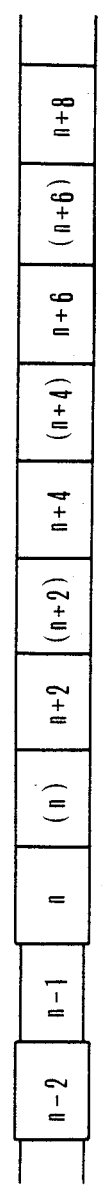
FIG.2(a) FIG.2(b) FIG.2(c) FIG.2(d) FIG.2(e) FIG.2(f)

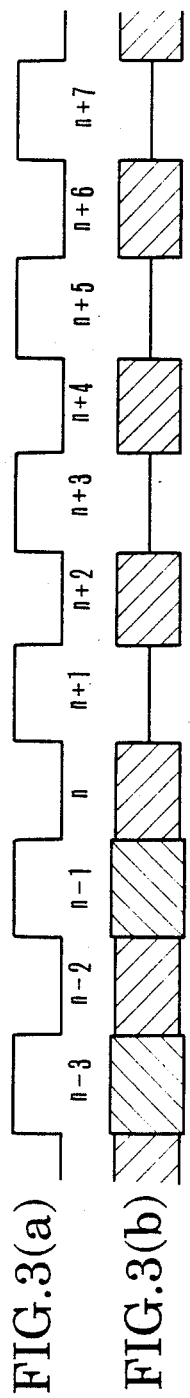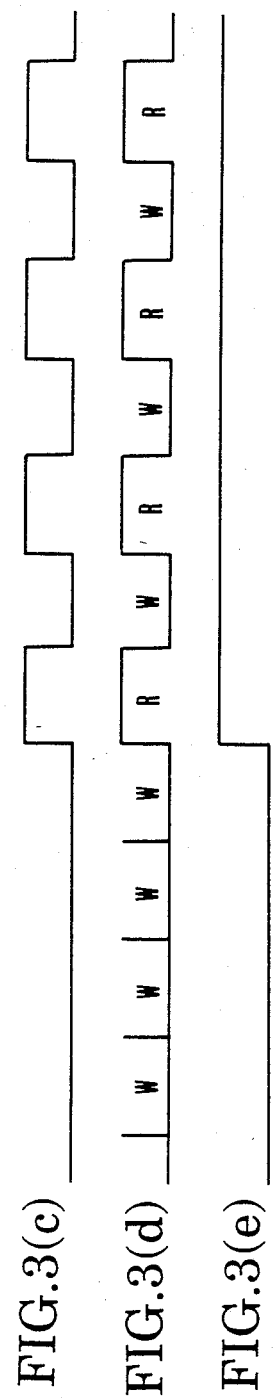
FIG.3(a) FIG.3(b) FIG.3(c) FIG.3(d) FIG.3(e) FIG.3(f)

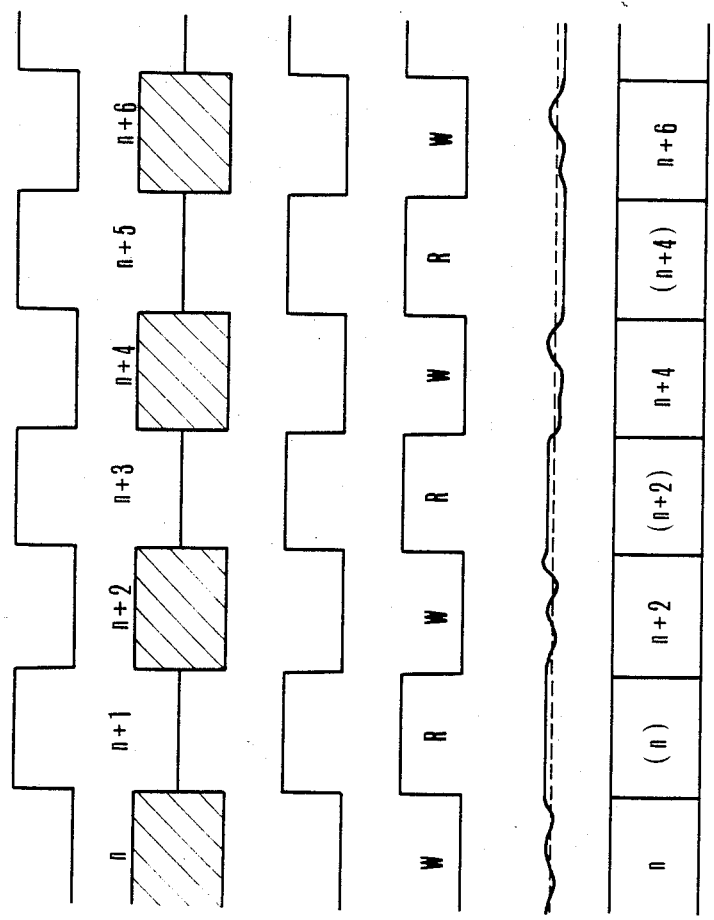

VIDEO REPRODUCTION APPARATUS WITH PLURAL HEADS AND FIELD MEMORY

BACKGROUND OF THE INVENTION

1. Field of the Invention

This invention relates to video signal reproduction apparatus and, more particularly, to a video signal reproduction apparatus in which a plurality of heads reproduce tracks successively one at a time in each predetermined period, and which has a memory capable of storing video signals for at least the aforesaid predetermined period.

2. Description of the Related Art

The VTRs (video tape recorders) have generally a feature that two reproducing heads are arranged on a rotary drum to alternatively trace the recording tracks of the video tape one by one to obtain a continuous stream of the reproduced video signals. In an event that foreign particles accidentally come in between one of these two reproducing heads and the video tape fails in obtaining the sufficiently reproduced output, or when recording no good recording tracks could be formed, however, there is some possibility of occurrence of a breakage in the continuity of the reproduction of video signals. In the conventional video reproduction apparatus, for such an occasion, a satisfactory reproduced image could not be obtained. This will be encountered even when it happens during the recording that foreign particles enter between the two recording heads and the tape.

Another problem arising from the use of the ATF type in the VTR where the video signals are recorded with tracking pilot signals in superimposed relation is that when the satisfactory reproduction does not take place, there is a possibility of occurrence of a faulty tracking operation, because the pilot signals cannot be obtained.

SUMMARY OF THE INVENTION

The present invention has a general object to eliminate all the above-described problems.

Another object is to provide a video signal reproduction apparatus in which even when it happens that the sufficient reproduction output is not obtained from one of a plurality of reproducing heads, a good reproduced signal can be obtained.

Still another object of the invention is to provide a video signal reproduction apparatus capable of assuring production of good reproduced signals even when one of a plurality of recording heads has failed to carry out sufficient recording.

Under such an object, according to the invention, a video signal reproduction apparatus is proposed comprising transport means capable of transporting a recording medium having a video signal recorded thereon at the same predetermined speed as when the video signal was recorded, a plurality of reproducing heads each arranged to trace the recording medium in a direction crossing the direction in which the transport means transports the recording medium, switching means for alternately selecting reproduced signals from the plurality of reproducing heads to output a video signal, memory means capable of storing at least one field of the video signal obtained through the switching means, detecting means for detecting whether or not a reproduced output is obtained from the plurality of reproducing heads, control means arranged to be operable when the transport means transports the recording medium at the predetermined speed and to control a mode of the memory means between a writing mode and a reading mode in accordance with an output of the detecting means, and output means for selectively outputting the video signal obtained through the switching means and the video signal read out from the memory means.

A further object of the invention is to provide a video signal reproduction apparatus in which even when the sufficient reproduced output is not obtained from one of a plurality of reproducing heads, while performing the tracking control by using the pilot signals recorded on the recording medium, good reproduced signals can be obtained.

Under such an object, according to the invention, a video signal reproduction apparatus is proposed comprising transport means capable of transporting a recording medium having a video signal and pilot signals for tracking control recorded thereon at the same predetermined speed as when the video signal was recorded, a plurality of reproducing heads each arranged to trace the recording medium in a direction crossing the direction in which the transport means transports the recording medium, switching means for alternately selecting reproduced signals from the plurality of reproducing heads to output a video signal, detecting means for detecting whether or not a reproduced output is obtained from the plurality of reproducing heads, means for forming a tracking control signal by using the pilot signals included in an output of the switching means, transport control means for controlling a transportation operation of the transport means, and supply control means for controlling supply of the tracking control signal to the transport control means in accordance with an output of the detecting means.

These and other objects and features of the invention will become apparent from the following description of embodiments thereof by reference to the drawings.

BRIEF DESCRIPTION OF THE DRAWINGS

FIGS. 2(a)–2(f) and 3(a)–3(f) are timing charts illustrating the timings of the operations of the various portions of FIG. 1.

FIGS. 6(a)–6(f) are timing charts illustrating the timings of the operations of the various parts of FIG. 5.

DETAILED DESCRIPTION OF THE PREFERRED EMBODIMENTS

Figure 1:
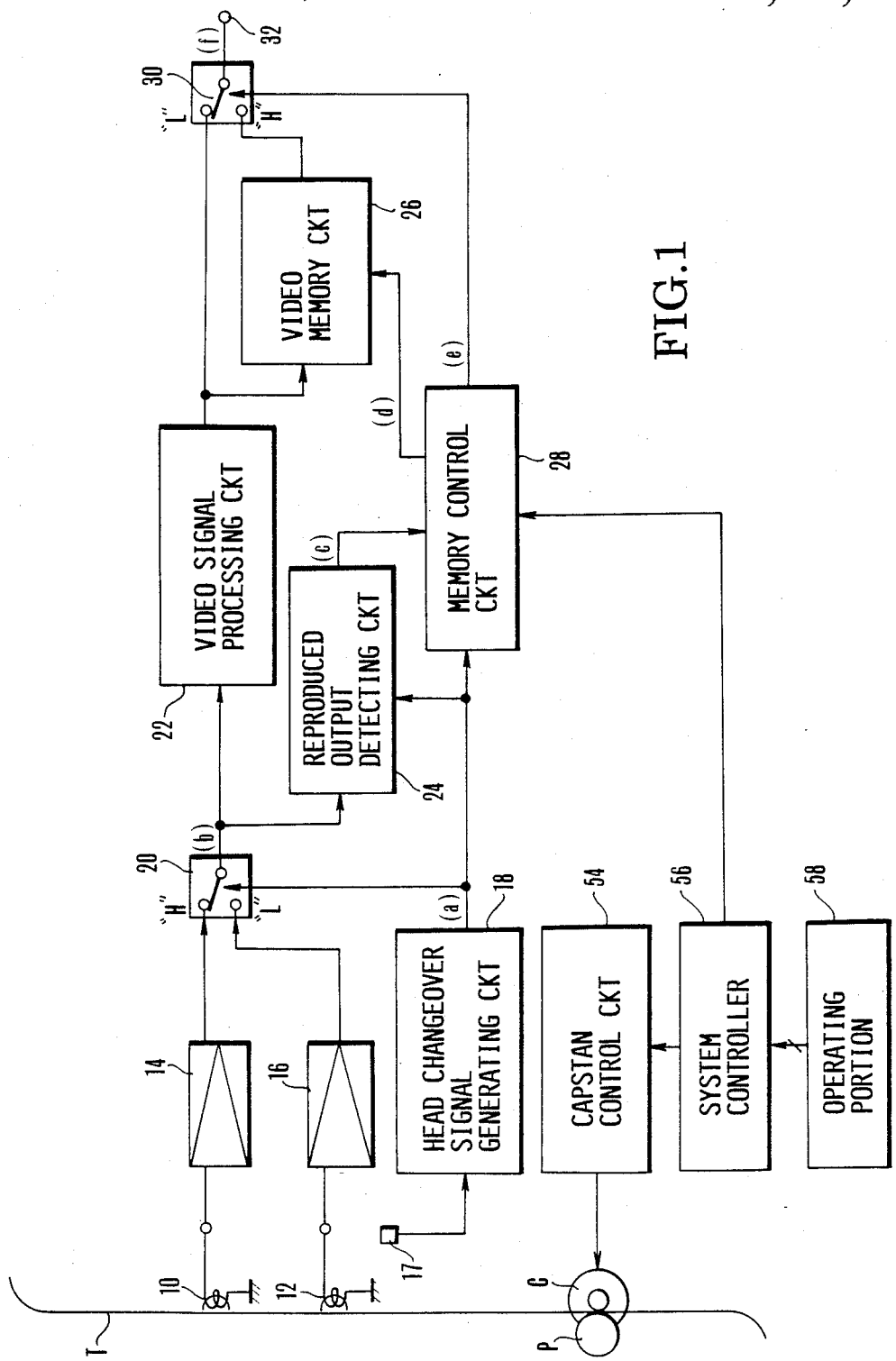
FIG. 1 is a diagram illustrating the construction of the main parts of an embodiment of a VTR according to the invention.

The invention is next described in connection with embodiments thereof by reference to the drawings. FIG. 1 in block diagram shows an embodiment of the invention applied to the reproduction system of the video tape recorder having rotary heads.

In FIG. 1, rotary heads 10 and 12 are arranged on a rotary drum (not shown) in diametrically opposite positions to each other. The video RF signals reproduced from a magnetic tape T by the rotary heads 10 and 12 are amplified by amplifiers 14 and 16 respectively. A detector 17 produces an output representing the phase of rotation of the rotary drum, from which a circuit 18 produces a head changeover signal. Depending on this head changeover signal, an analog switch 20 operates in such a manner that when it is "H" level, the trace output signal from the rotary head 10 is selected, and when "L", the trace output signal from the rotary head 12 is selected.

A video signal processing circuit 22 performs reproduction treatments such as demodulation and time base correction. A reproduced output detecting circuit 24 monitors the reproduced signals by the rotary head 10 or 12. A video memory circuit 26 has a memory capacity of at least one field, including an A/D converter for digital memory and a D/A converter for making analog output. A memory control circuit 28 controls the video memory circuit 26 in accordance with the head changeover signal from the head changeover signal generating circuit 18, the detection signal from the reproduced output detecting circuit 24 and others. An analog switch 30 changes its switched position depending on the changeover signal from the memory control circuit 28 to select either the output of the video signal processing circuit 22 or the output of the video memory circuit 26. 32 is a reproduced signal output terminal.

Also, a capstan C and a pinch roller P cooperate with each other to transport the magnetic tape T in the longitudinal direction. The rotation of this capstan C is controlled by a capstan control circuit 54. A system controller 56 controls the capstan control circuit 54, memory control circuit 28, etc. in accordance with the mode determined by the operation of the operating portion 58.

When the normal reproduction is indicated by the operating portion 58, the capstan control circuit 54 by the action of the system controller 56 controls the capstan C in such a manner that the tape T runs at the same speed as when the recording was made. Also, it renders operative the memory control circuit 28 to make it possible to write and read data in and from the video memory circuit 26.

Next, the operation of the illustrated embodiment when in the normal reproduction is explained by reference to the timing charts of FIGS. 2(a)-2(f) and FIGS. 3(a)-3(f). FIGS. 2(a)-2(f) show a case that the sufficient reproduced signal is not obtained from the rotary head 12, and FIGS. 3(a)-3(f) show another case that the sufficient reproduced signal is not obtained from the opposite rotary head 10. FIG. 2(a) and FIG. 3(a) illustrate the head changeover signal produced from the head changeover signal generating circuit 18. FIGS. 2(b) and 3(b) illustrate the output of the analog switch 20. FIGS. 2(c) and 3(c) illustrate the reproduction error signal produced from the reproduced output detecting circuit 24. FIGS. 2(d) and 3(d) illustrate the control signal for writing (W) or reading (R) of the video memory circuit 26 by the memory control circuit 28; FIGS. 2(e) and 3(e) illustrate the changeover signal from the memory control circuit 28 to the analog switch 30; and FIGS. 2(f) and 3(f) illustrate the output signal of the reproduced signal output terminal 32. In this example under explanation, it is assumed that the tracks of the periods . . . , (n−2), (n−1) and n had been normally reproduced, but, after that, in the tracks of the subsequent periods (n+1), (n+3), (n+5) and (n+7), the sufficient reproduction outputs were not obtained from some reasons.

In the case of FIGS. 2(a)-2(f), when the head changeover signal shown in FIG. 2(a) is produced at the output of the circuit 18, the analog switch 20 is changed over for each field so that the video signal processing circuit 22 and the reproduced output detecting circuit 24 are supplied with the reproduced signal such as that shown in FIG. 2(b). When the reproduction is normal, the reproduction error signal is not produced from the reproduced output detecting circuit 24 and the memory control circuit 28 renders the video memory circuit 26 always in the written state. Therefore, the memory content of the video memory circuit 26 is renewed in sequence by the output of the video signal processing circuit 22.

As the period (n+1) arrives, when the reproduced signal is not obtained from the rotary head 12, the reproduced output detecting circuit 24 produces a reproduction error signal. Then, responsive to this signal, the memory control circuit 28 sets the video memory circuit 26 to the read mode (FIG. 2(d)), causing the video signal of the period n to be outputted from the video memory circuit 26. At the same time, the changeover signal (FIG. 2(e)) is produced, causing the analog switch 30 to be changed over to the output side of the video memory circuit 26. After that, in those periods which allow for obtaining the normal reproduction output from the rotary head, or (n+2), (n+4) and (n+6), the video memory circuit 26 is rendered to the writing state where the normal reproduced signal is written, and in those periods which are on the time of reproduction error, or (n+3), (n+5) and (n+7), that signal which has been written in the video memory circuit 26 in the immediately preceding period is read out. By the operation changeover of the video memory circuit 26 and the changeover of the switch 30, it is at the output terminal 32 that the reproduced video signal of normal level as shown in FIG. 2(f) is obtained.

Figure 4:
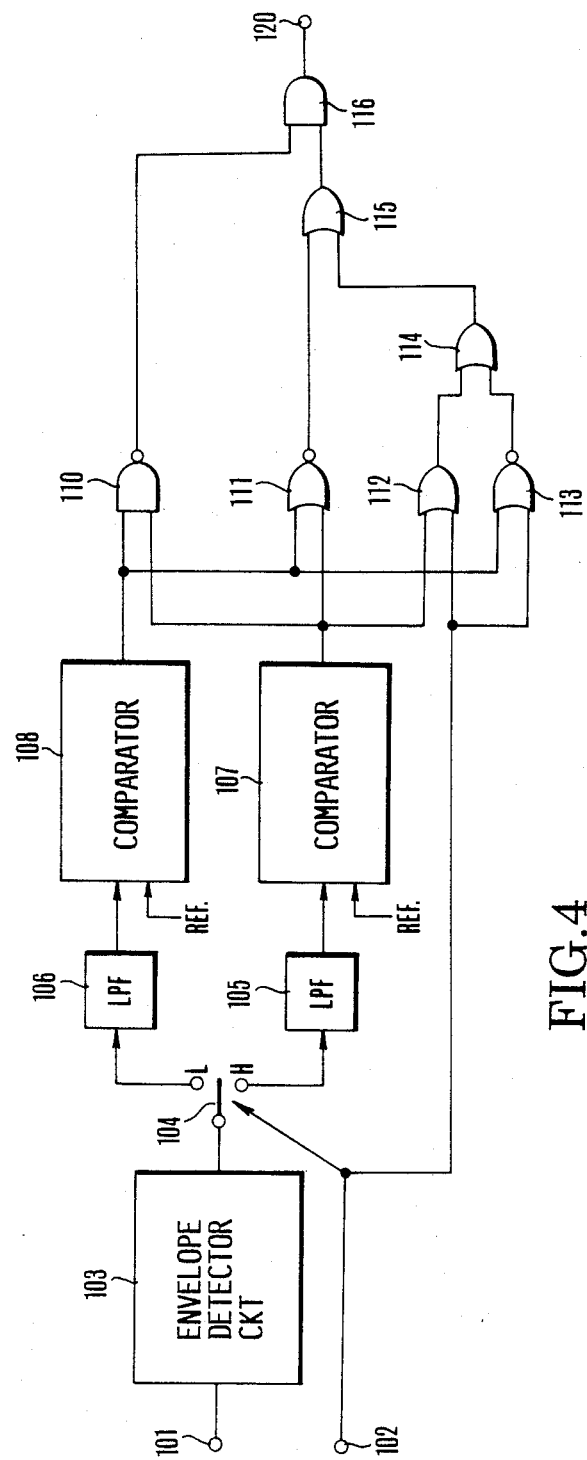
FIG. 4 is a diagram of a practical example of the reproduced output detecting circuit of FIG. 1.

Here, as the reproduction output detecting circuit 24, only an envelope detector circuit may be provided, but it is desirable to make it such an arrangement as shown in FIG. 4.

In FIG. 4, a terminal 101 is supplied with the output signal from the switch 20. Another terminal 102 is supplied with the head changeover signal. 103 is the envelope detector circuit. A switch 104 is controlled by the head changeover signal to supply the envelope detection output related to the output of the head 10 to an LPF (low-pass filter) 105 and to supply the envelope detection output related to the output of the head 12 to another LPF 106. The LPFs 105 and 106 are filters of large time constant and sufficiently small cut-off frequency. Their outputs are compared with a predetermined level (REF.) by comparators 107 and 108, being set to logic "1" or "0" level. These low-pass filters 106 and 105 are provided so that a lowering of the reproduction level for a short time such as the drop-out does not actuate the rear stage or the memory control circuit 28. That is, the output of the comparator 107 or 108 takes "0" only when the sufficient reproduction output is not obtained for a long time.

Now, in the state that both heads 10 and 12 can obtain the sufficient reproduction output, the output of a NAND gate 110 is "0". Therefore, the output of an AND gate 116 also becomes "0". Also, in a case when the sufficient reproduction output cannot be obtained from any of the heads, the output of a NOR gate 111 is "1", and the outputs of an OR gate 115 and the AND gate 116 also become "1". In a case when the sufficient reproduction output cannot be obtained from the head 12 but can be obtained from the head 10 (in the case of FIGS. 2(a)–2(f), the inverted signal of the head changeover signal is obtained from a NOR gate 113, being outputted through an OR gate 114, the OR gate 115 and the AND gate 116. In a case when the sufficient reproduction output cannot be obtained from the head 10 but can be obtained from the head 12 (in the case of FIGS. 3(a)–3(f)), an OR gate 112 places the head changeover signal in the output thereof as it is, which is then applied to an output terminal 120 through the OR gate 114, the OR gate 115 and the AND gate 116.

According to the above-described arrangement, for a lowering of the reproduction output for a short time, no response occurs, and the changing over between "1" and "0" takes place by only every one field period. Thus there is no possibility of production of an unpleasant picture due to the appearance of discontinuity in the reproduced image.

FIGS. 3(a)–3(f) though showing the case of the other rotary head 10 failing in obtaining the reproduced signal, are fundamentally identical to the case of FIGS. 2(a)–2(f). So, their explanation is omitted here.

Also, though the foregoing embodiment has been described as using two reproducing heads alternately, the invention is applicable to another type of apparatus using three or more reproducing heads selected in sequence.

Figure 5:
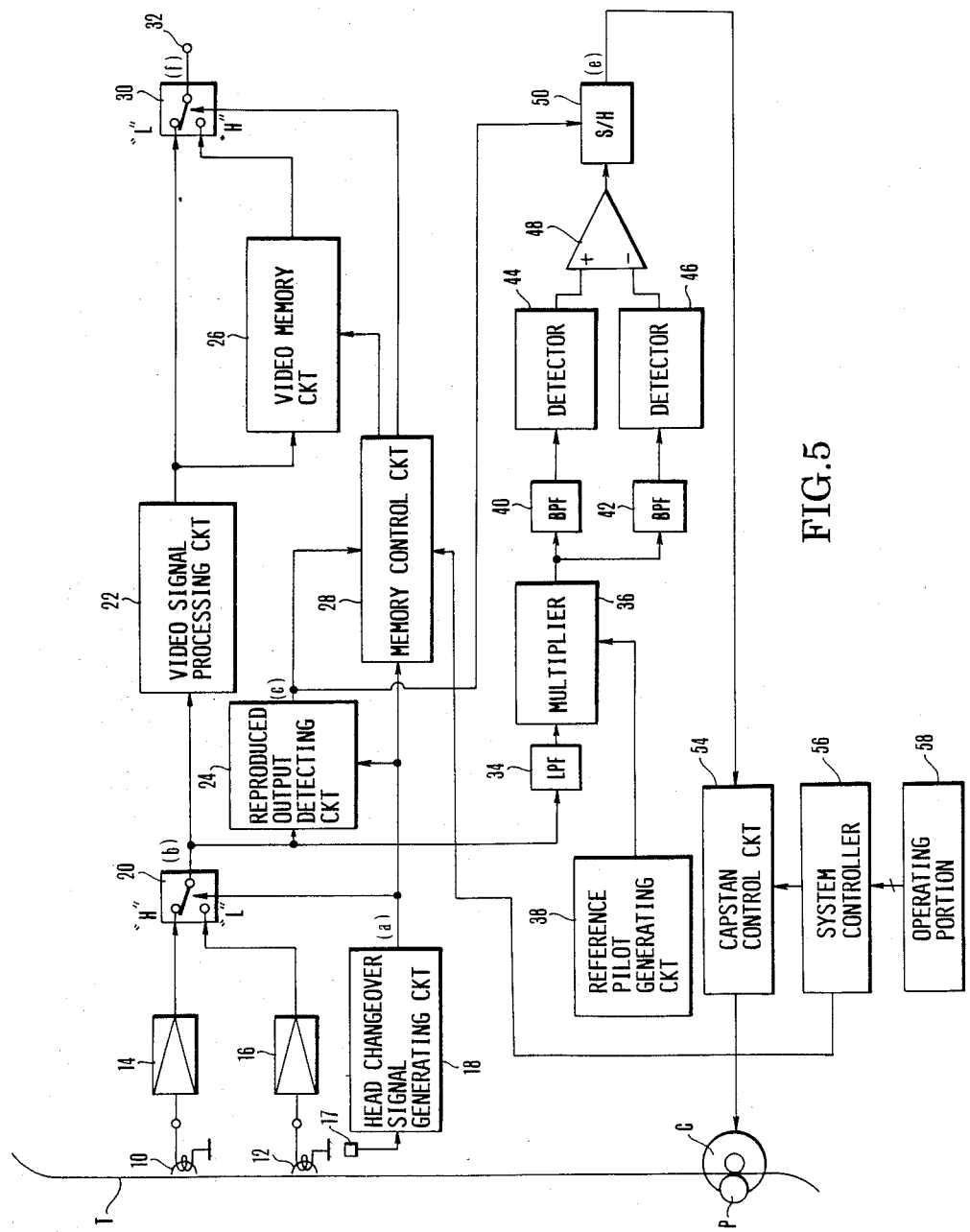
FIG. 5 is a diagram illustrating the construction of the main parts of another embodiment of the VTR according to the invention.

FIG. 5 in diagram illustrates the construction of the reproduction system of another embodiment of the VTR according to the invention, wherein like constituent elements to those of FIG. 1 are denoted by the same numerals. In this embodiment, the tape T is assumed to have video signals recorded along with four pilot signals of the known 4-frequency method in frequency-superimposed relation.

A low-pass filter (LPF) 34 receives the reproduced RF signal from the switch 20 (reproducing heads 10, 12) and extracts the pilot signals necessary to tracking therefrom. 36 is a multiplier. A circuit 38 generates tracking reference pilot signals of the same frequencies as those of the aforesaid pilot signals. Band pass filters (BPFs) 40 and 42 pass those components of the output of the multiplier 36 which have the frequencies $f_H$ (the horizontal synchronizing frequency) or $3f_H$, respectively. 44 and 46 are envelope detectors. 48 is a differential amplifier. A sample-hold circuit 50 samples and holds the output of the differential amplifier 48 in response to the reproduction error signal from the reproduced output detecting circuit 24, and supplies a tracking error signal to the capstan control circuit 54.

Next, by reference to FIGS. 6(a)–6(f), the operation of this embodiment is explained.

In this example of explanation, it is assumed that the tracks up to the period n had been normally reproduced, but, after that, in the tracks of the periods (n+1), (n+3), (n+5) and (n+7) the sufficient reproduction output could not be obtained from some reason.

The multiplier 36 multiplies the tracking pilot signal produced from the LPF 34 by the tracking reference pilot signal from the generating circuit 38, and a tracking error signal is formed by the BPFs 40 and 42, the detectors 44 and 46 and the differential amplifier 48. In a state that the hold signal from the reproduced output detecting circuit 24 is not applied to the sample-hold circuit 50, the sample-hold circuit 50 places the output of the differential amplifier 48 as it is to the input of the capstan control circuit 54. Therefore, when the normal reproduction occurs, the tracking error signal of the terminal 52 is obtained likewise as in the prior art.

As the period (n+1) arrives, when no reproduced signal is obtained from the rotary head 12, the sample-hold circuit 50 samples and holds the output of the differential amplifier 48 in response to the reproduction error signal from the reproduced output detecting circuit 24. Therefore, the tracking error signal produced from the sample-hold circuit 50 becomes constant as shown in FIG. 6(e). If this sampling and holding operation is not carried out, the tracking error signal would be caused to change extremely, and the normal reproduction from the normal head 10 also would become impossible.

After that, in the periods (n+2), (n+4) and (n+6) for which the normal reproduction output can be obtained from the rotary head 10, the writing mode of the video memory circuit 26 is rendered operative, and the normal reproduced signal is written therein. In the periods (n+3), (n+5) and (n+7) which are in the time of reproduction error, that signal which has been written in the video memory circuit 26 in the immediately preceding period is read out, and the tracking error signal to be produced by the sample-hold circuit 50 is made constant. Since, as the tracking error signal is maintained constant for a while, the tracking is sustained, it becomes possible that the reproduction from the normal head can continue. Therefore, by changing the mode of operation of the video memory circuit 26 and by changing over the switch 30, the reproduced video signal of normal level can be obtained at the output terminal 32 as shown in FIG. 6(f).

What is claimed is:

1. A video signal reproduction apparatus comprising:
   (a) transport means capable of transporting a recording medium having a video signal recorded thereon at the same predetermined speed as when said video signal was recorded;
   (b) a plurality of reproducing heads each arranged to trace said recording medium in a direction crossing the direction in which said transport means transports said recording medium;
   (c) switching means for alternately selecting reproduced signals from said plurality of reproducing heads to output a video signal;
   (d) memory means capable of storing at least one field of the video signal obtained through said switching means;
   (e) detecting means for detecting whether or not a reproduction output is obtained from said plurality of reproducing heads;
   (f) control means, arranged to be operable when said transport means transports said recording medium at said predetermined speed, for controlling a mode of said memory means between a writing mode and a reading mode in accordance with an output of said detecting means; and
   (g) output means for selectively outputting the video signal obtained through said switching means and the video signal read out from said memory means.

2. An apparatus according to claim 1, wherein said detecting means includes a plurality of detecting circuits for determining whether or not a reproduction output is obtained from each of said plurality of reproducing heads.

3. An apparatus according to claim 1, wherein said detecting means includes an envelope detecting circuit for detecting an envelope of the reproduced signals from said plurality of reproducing heads, and low pass filters to which an output signal from said envelope detecting circuit is applied.

4. An apparatus according to claim 1, wherein an output signal from said detecting means is a binary signal which inverts in synchronism with a selecting operation of said switching means.

5. A video signal reproduction apparatus comprising:
   (a) transport means capable of transporting a recording medium having a video signal and pilot signals for tracking control recorded thereon at the same predetermined speed as when said video signal was recorded;
   (b) a plurality of reproducing heads each arranged to trace said recording medium in a direction crossing the direction in which said transport means transports said recording medium;
   (c) switching means for alternately selecting reproduced signals from said plurality of reproducing heads to output a video signal;
   (d) detecting means for detecting whether or not a reproduction output is obtained from said plurality of reproducing heads;
   (e) means for forming a tracking control signal by using said pilot signals included in an output of said switching means;
   (f) transport control means for controlling a transportation operation of said transport means; and
   (g) supply control means for controlling supply of said tracking control signal to said transport control means in accordance with an output of said detecting means.

6. An apparatus according to claim 5, wherein said supply control means includes a sample-hold circuit for sampling and holding said tracking control signal.

7. An apparatus according to claim 5, wherein an output signal from said detecting means is a binary signal which inverts in synchronism with a selecting operation of said switching means.

8. An apparatus according to claim 5, further comprising:
   memory means capable of storing at least one field of the video signal obtained through said switching means;
   control means, arranged to be operable when said transport means transports said recording medium at said predetermined speed, for controlling writing and reading of said memory means in accordance with the output of said detecting means; and
   output means for selectively outputting the video signal obtained through said switching means and the video signal read out from said memory means.

* * * * *